(12) United States Patent
Lodha et al.

(10) Patent No.: US 11,627,193 B2
(45) Date of Patent: Apr. 11, 2023

(54) METHOD AND SYSTEM FOR TRACKING APPLICATION ACTIVITY DATA FROM REMOTE DEVICES AND GENERATING A CORRECTIVE ACTION DATA STRUCTURE FOR THE REMOTE DEVICES

(71) Applicant: ORACLE INTERNATIONAL CORPORATION, Redwood Shores, CA (US)

(72) Inventors: Suryaveer Singh Lodha, San Francisco, CA (US); William Blaby, Concord, CA (US)

(73) Assignee: Oracle International Corporation, Redwood Shores, CA (US)

( * ) Notice: Subject to any disclaimer, the term of this patent is extended or adjusted under 35 U.S.C. 154(b) by 50 days.

(21) Appl. No.: 15/834,369

(22) Filed: Dec. 7, 2017

(65) Prior Publication Data
US 2019/0182343 A1     Jun. 13, 2019

(51) Int. Cl.
*H04L 67/50* (2022.01)
*H04L 41/22* (2022.01)
(Continued)

(52) U.S. Cl.
CPC .......... *H04L 67/535* (2022.05); *G06F 9/5061* (2013.01); *G06F 11/0709* (2013.01);
(Continued)

(58) Field of Classification Search
CPC . H04L 67/22; H04L 41/5067; H04L 41/5003; H04L 41/5009; H04L 41/5025;
(Continued)

(56) References Cited

U.S. PATENT DOCUMENTS 9,189,317 B1 * 11/2015 Marimuthu ............... G06F 8/70
9,542,259 B1 *  1/2017 McEwen ............. G06F 11/2257
(Continued)

FOREIGN PATENT DOCUMENTS

JP    2016505969 A    2/2016
WO    2013038489 A1   3/2013

OTHER PUBLICATIONS

Patent Cooperation Treaty (PCT) International Search Report and Written Opinion in co-pending PCT International Appl. No. PCT/US2018/064153 (International Filing Date of Dec. 6, 2018) dated Mar. 27, 2019 (10 pgs.).

(Continued)

*Primary Examiner* — Kevin T Bates
*Assistant Examiner* — Ranjan Pant
(74) *Attorney, Agent, or Firm* — Kraguljac Law Group, LLC

(57) ABSTRACT

Systems, methods, and other embodiments associated with generating a corrective action data structure for a set of remote devices based upon corrective actions are described. In one embodiment, a method includes receiving application activity data from a plurality of remote devices. The application activity data is analyzed to determine a set of application activities associated with each of the plurality of remote devices, and the sets of application activities are analyzed to determine one or more challenges associated with a set of remote devices of the plurality of remote devices. Corrective actions are determined for each of the one or more challenges, and a corrective action data structure is generated for the set of remote devices based upon the corrective actions.

20 Claims, 9 Drawing Sheets

(51) Int. Cl.
  *H04L 67/10* (2022.01)
  *G06F 9/50* (2006.01)
  *G06F 11/34* (2006.01)
  *G06F 11/07* (2006.01)

(52) U.S. Cl.
  CPC .......... *G06F 11/3495* (2013.01); *H04L 41/22* (2013.01); *H04L 67/10* (2013.01)

(58) Field of Classification Search
  CPC . H04L 47/803; H04L 47/808; H04L 63/1408; H04L 63/1416; H04L 43/045; H04L 43/12; H04L 43/16; H04L 67/04; H04L 69/40; H04L 41/22; H04L 67/10; H04L 67/535; G06F 11/366; G06F 21/554; G06F 9/5061; G06F 11/3495; G06F 11/0709; Y02D 10/00
  See application file for complete search history.

(56) References Cited

U.S. PATENT DOCUMENTS

| | | | | |
|---|---|---|---|---|
| 10,031,652 | B1* | 7/2018 | Yang | G06F 3/04842 |
| 10,098,025 | B2* | 10/2018 | Partheniou | H04L 43/0817 |
| 2004/0024921 | A1* | 2/2004 | Peake, Jr. | G06F 11/3485 |
| | | | | 710/1 |
| 2005/0015678 | A1* | 1/2005 | Miller | G06F 11/2294 |
| | | | | 714/38.14 |
| 2005/0187940 | A1* | 8/2005 | Lora | G06F 11/004 |
| 2006/0229848 | A1 | 10/2006 | Armstrong et al. | |
| 2007/0168696 | A1* | 7/2007 | Ridel | H04L 43/00 |
| | | | | 714/4.1 |
| 2008/0065700 | A1* | 3/2008 | Lim | G06F 21/604 |
| 2009/0043646 | A1* | 2/2009 | Pingali | G06F 11/3409 |
| | | | | 705/7.27 |
| 2013/0042154 | A1* | 2/2013 | Agarwal | G06F 11/079 |
| | | | | 714/38.14 |
| 2013/0045685 | A1* | 2/2013 | Kiani | G16H 10/65 |
| | | | | 455/41.2 |
| 2013/0298018 | A1* | 11/2013 | Aqrawi | G06F 3/048 |
| | | | | 715/704 |
| 2015/0067147 | A1* | 3/2015 | Carmel | H04L 43/0817 |
| | | | | 709/224 |
| 2015/0172321 | A1* | 6/2015 | Kirti | H04L 63/20 |
| | | | | 726/1 |
| 2015/0262067 | A1* | 9/2015 | Sridhara | G06N 5/04 |
| | | | | 706/12 |
| 2017/0286199 | A1* | 10/2017 | Soini | G06F 9/44 |
| 2018/0034850 | A1* | 2/2018 | Turgeman | H04L 67/306 |
| 2018/0210808 | A1* | 7/2018 | Shanmugam | G06F 11/366 |

OTHER PUBLICATIONS

India Patent Office, First Examination Repod issued in India Patent Application No. 202047017629 dated Mar. 11, 2022 (6 pgs.).

Chinese Patent Office, First Office Action issued in Chinese Patent Application No. 201880078737.1 having a date of mailing of Dec. 15, 2022 (9 pgs.).

* cited by examiner

APPLICATION ACTIVITY DATA STRUCTURE — 130

| APPLICATION | ACTIVITY | DEVICE | TIME |
|---|---|---|---|
| CALL CENTER MANAGER | SEARCH ACCOUNT | DEVICE (1) | TIMESTAMP (1) |
| METER DATA MANAGER | SEARCH FOR ADDRESS | DEVICE (2) | TIMESTAMP (2) |
| CALL CENTER MANAGER | VIEW ACCOUNT TREE | DEVICE (3) | TIMESTAMP (3) |
| CALL CENTER MANAGER | OPEN BRANCH IN TREE | DEVICE (3) | TIMESTAMP (4) |
| CUSTOMER BILLING | BROWSE CUSTOMER PROFILE | DEVICE (3) | TIMESTAMP (5) |

METHOD AND SYSTEM FOR TRACKING APPLICATION ACTIVITY DATA FROM REMOTE DEVICES AND GENERATING A CORRECTIVE ACTION DATA STRUCTURE FOR THE REMOTE DEVICES

BACKGROUND

Computing devices are used to implement various services and products. For example, various computing devices may provide a scheduling service, such as scheduling of tasks to be performed using vehicles, and a communication service, such as transmitting messages to, and receiving messages from, other computing devices. Scheduled tasks and transmitted/received messages may be stored within databases or other storage structures of a distributed network environment (e.g., a cloud service), or within databases or other storage structures of a local computer. Users may interact with each of the computing devices to perform operations upon corresponding scheduled tasks and corresponding transmitted/received messages. For example, each computing device may be used to add new tasks, to remove existing tasks, or to modify existing tasks, or to generate new messages, remove existing messages, or modify existing messages.

The scheduling service and the communication service may have bugs or shortcomings that may hinder the usage of the services by users of some of the computing devices. Such bugs or shortcomings may not be identified or known to the providers of the services.

In order to improve the performance of the computing devices, the effectiveness of the services, the rate of successful completion of tasks and transmission of messages, and satisfaction of customers of the services, it is desirable for the providers of the services to be able to efficiently identify and correct bugs or shortcomings of the services.

Unfortunately, typical existing techniques are limited to using observational and anecdotal information to identify bugs or shortcomings. Thus, the improvement of services has been restricted by having a limited, and often slowly received, source of information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates an embodiment of an application activity data structure.

DETAILED DESCRIPTION

Computerized systems and methods are described herein that provide for determining corrective actions for challenges associated with a set of remote devices. In one embodiment, a plurality of remote devices may each run one or more applications. For example, a first remote device may run a first application and a second application, and a second remote device may run (a different instance of) the first application and the second application.

The operation of each remote device may include performing various actions while attempting to achieve various objectives/results. Often, an initial action is not sufficient to achieve an objective, and additional actions are performed until the objective is reached. Thus, while operating the first application on the first remote device in order to meet a first objective/result, a first user may perform a first series of actions, or after performing a first action, may switch to the second application and perform a second action. Similarly, while operating the first application on the second remote device in order to meet the first objective/result, a second user may perform the first series of actions, or after performing the first action, may switch to the second application and perform the second action.

Unfortunately, users of such applications may face significant delay and hurdles to meeting their objectives/results, or may fail to achieve the objectives altogether. Such delays and failures can lead to a fall in satisfaction with the application and ultimately a decrease in use of the applications. It may be appreciated that such delays and failures can occur even when the applications are technically capable of performing the desired objectives.

Thus, in order to optimize the performance of the applications, the actions performed on the various remote devices operating the applications may need to be analyzed to identify challenges and corrective actions that can address the identified challenges. By doing so, objectives may be reached using a reduced number of activities and resources, which may improve efficiency, resource (e.g., memory, bandwidth, processor, etc.) availability, and reduce power usage.

Figure 1:
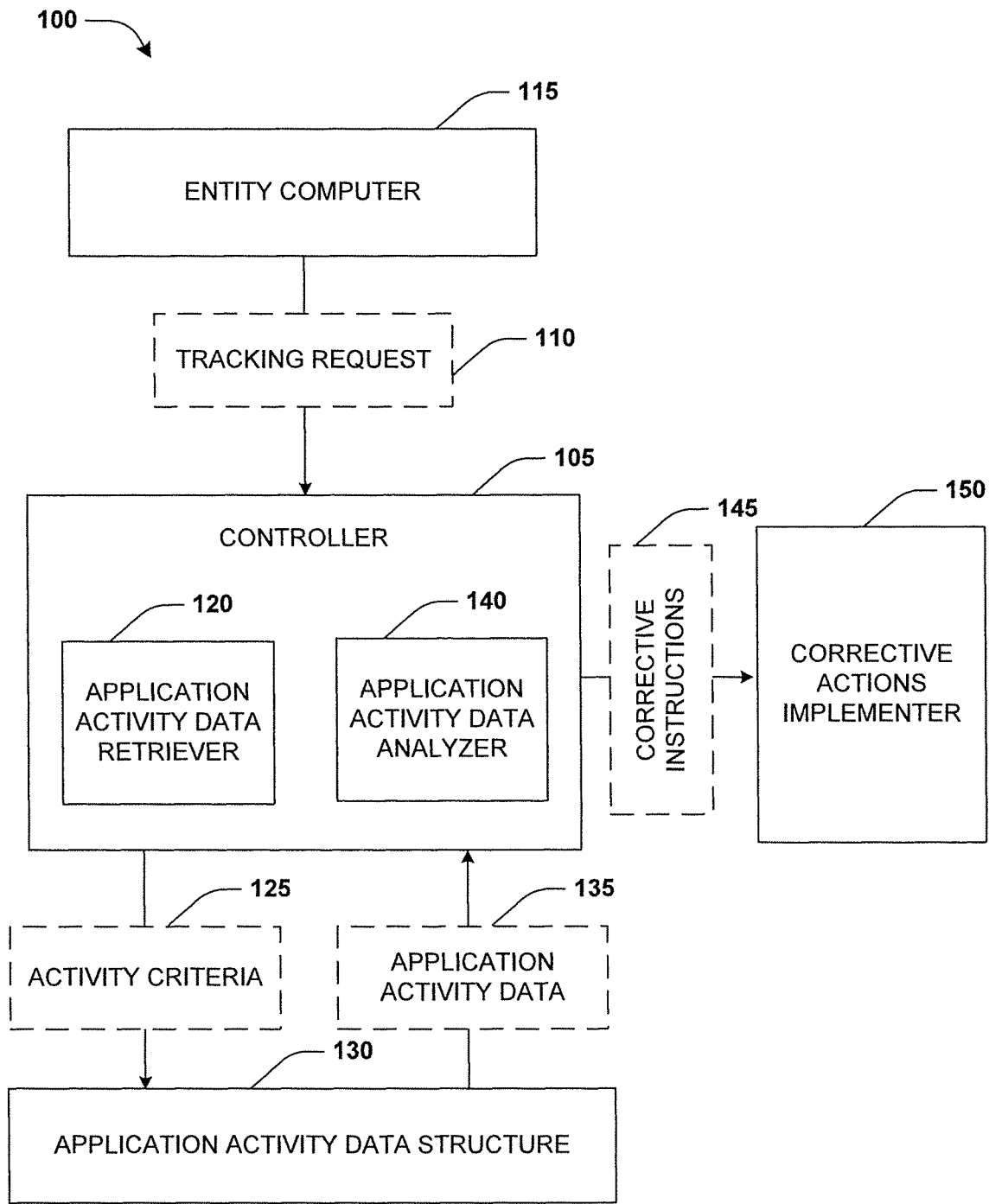
FIG. 1 illustrates an embodiment of a system associated with determining corrective actions for challenges associated with a set of remote devices.

With reference to FIG. 1, one embodiment of a computerized system 100 associated with determining corrective actions for challenges associated with a set of remote devices is illustrated. The system 100 includes a controller 105, which may be configured to execute on a computer. The controller 105 may be initiated based upon a tracking request 110 being received from an entity computer 115, such as a computer of a manager of an application platform that is requesting that activities of one or more applications of the application platform on remote devices be tracked/monitored. For example, the application platform may provide various utility/productivity applications that are used for commercial purposes by various clients/companies. Such applications may include a customer self-service application, a customer care and billing application, a service order management application, a smart grid gateway application, a meter data management application, a work and asset management application, an operational device management application, a mobile workforce management application, a distribution management system application, or an outage management system application. The controller 105 may receive the tracking request 110 over a network connection.

The controller 105 utilizes an application activity data retriever 120 to generate activity criteria 125 (of the tracking request 110) that identify data representative of an experience/story of one or more users with one or more applications on remote devices. The activity criteria 125 may specify one or more applications to be tracked in accordance with the tracking request 110, such as a customer care and billing application and a work and asset management application, or a type of activity/interaction, of a user with one or more applications, to be tracked. The type of activity/interaction may include a click, a keystroke, performance of an action, modification of a graphical rendering, or a selection of a user element, for example.

The activity criteria 125 are used to analyze an application activity data structure 130 in order to identify data records to be considered for the tracking request 110. The application activity data structure 130 includes data records of activities/interactions of users with applications. For example, data records indicative of clicks, actions, and modifications of a first application on a first remote device, selections of a second application on a second remote device, and actions of a third application on a third remote device may be aggregated and stored in the application activity data structure 130.

The controller 105 uses the application activity data structure 130 to generate application activity data 135 representative of the activities/interactions of users with applications that match the activity criteria 125. For example, a first activity criteria, such as the type of applications that the tracking request 110 is directed to tracking, and a second activity criteria, such as the type of activity to be tracked, may be used to search the application activity data structure 130. In some examples, the application activity data 135 may include representations of activities that meet at least one of the activity criteria 125, such as any activities that match at least one of the first activity criteria or the second activity criteria. In other examples, the application activity data 135 may include representations of activities that meet two or more, or all, of the activity criteria 125, such as activities that match both the first activity criteria and the second activity criteria (but not activities that only match one of the first activity criteria or the second activity criteria).

The controller 105 utilizes the application activity data analyzer 140 to analyze the application activity data 135 to determine a set of application activities associated with each of the plurality of remote devices. For example, a first set of application activities associated with a first remote device may be identified in the application activity data 135, and a second set of application activities associated with a second remote device may be identified in the application activity data 135.

The sets of application activity data may be analyzed to determine one or more challenges associated with a set of remote devices. In some examples, each set of application activity data may be analyzed individually to determine a challenge. For example, analysis of the first set of application activities may be performed to determine a first challenge associated with the first remote device, while analysis of the second set of application activities may be performed to determine a second challenge associated with the second remote device. In some examples, a plurality of sets of application activity data may be analyzed together to determine a challenge. For example, analysis of the first set of application activities and the second set of application activities (in combination) may be performed to determine a third challenge associated with the first remote device and the second remote device.

In some examples, remote devices are grouped into sets based upon their association with common challenges. For example, the first remote device with the first set of application activities and the second remote device with the second set of application activities may be grouped together into an exemplary set of remote devices in response to determining that both remote devices (and their application activities) face the (common) third challenge. A different remote device that does not face the third challenge is not included in the exemplary set of remote devices, but may be included in a different set of remote devices generated in association with a (common) fourth challenge. The application activities of each set of remote devices may be analyzed together to determine one or more challenges for the corresponding set of remote devices.

The controller 105 utilizes the application activity data analyzer 140 to determine corrective actions for each of the one or more challenges. For example, introduction of a new feature to an application may be determined to be the appropriate corrective action for the first challenge, while modification of an appearance of a graphical user interface element may be determined to be the appropriate corrective action for the second challenge, and removal of an old feature in an application may be determined to be the appropriate corrective action for the third challenge.

In some examples, the determination of corrective actions is based upon a matching of each identified challenge with a corresponding corrective action in a database. In some examples, the determination of corrective actions is based upon a comparison of value predicted to result from performing one or more corrective actions for each challenge. For example, a first value predicted to result from performing a first corrective action may be compared to a second value predicted to result from performing a second corrective action, and the corrective action associated with the higher value is selected.

The controller 105 generates corrective instructions 145 to provide to, and thus control, the corrective actions implementer 150. The corrective instructions 145 may provide for the corrective actions implementer 150 to perform the corrective actions corresponding to the challenges. The corrective instructions 145 includes a corrective action data structure comprising code that when transmitted to one or more remote devices running an application, causes a modification to the application that overcomes or mitigates at least one challenge. For example, the corrective instructions 145 may provide for transmitting an upgrade that adds the new feature to the first application, for transmitting a patch that modifies the graphical user interface element in the second application, or for transmitting a patch that removes the old feature in the first application and the second application (or generates an intermediate application to connect the first application with the second application).

Code for a corrective action may be transmitted to the corresponding set of remote devices associated with the challenge corresponding to the corrective action. For example, the upgrade adding the new feature may be transmitted to a first set of remote devices, the patch that modified the graphical user interface element may be transmitted to a second set of remote devices, and the patch that removes the old feature may be transmitted to a third set of remote devices. In the example, the third set of remote devices, which includes remote devices running the first application and the second application, may include at least some of the remote devices of the first set of remote devices, which run the first application, and at least some of the remote devices of the second set of remote devices, which run the second application.

In some examples, the corrective instructions 145 are transmitted to a managing entity of remote devices determined to face the corresponding challenges. The managing entity can include a service providing or operating the applications on a plurality of remote devices, such a creator or service provider of the applications. The managing entity can analyze the corrective instructions 145 and generate code, based upon the analysis, to address the challenges. For example, the code generated may correspond to a patch or upgrade for an application that the managing entity may transmit to remote devices, or may correspond to a patch, upgrade or fix for a framework used for one or more applications.

In some examples, the corrective instructions 145 comprise a corrective action data structure that comprises a report. The report identifies the challenges identified in association with the set of remote devices, and identifies the corrective actions determined to address the challenges. For example, the corrective instructions 145 may provide for the corrective actions implementer 150 to change a graphical representation of the sets of application activities associated with the challenges to visually distinguish the graphical representation of the sets of application activities associated with the challenges from graphical representations of other application activities (not associated with the challenges). The controlling of the corrective actions implementer 150 increases the speed at which the tracking request 110 is identified by reducing or eliminating time needed to search and navigate through various menus and displays, and thus improves the speed and usability of computer displays.

Figure 9:
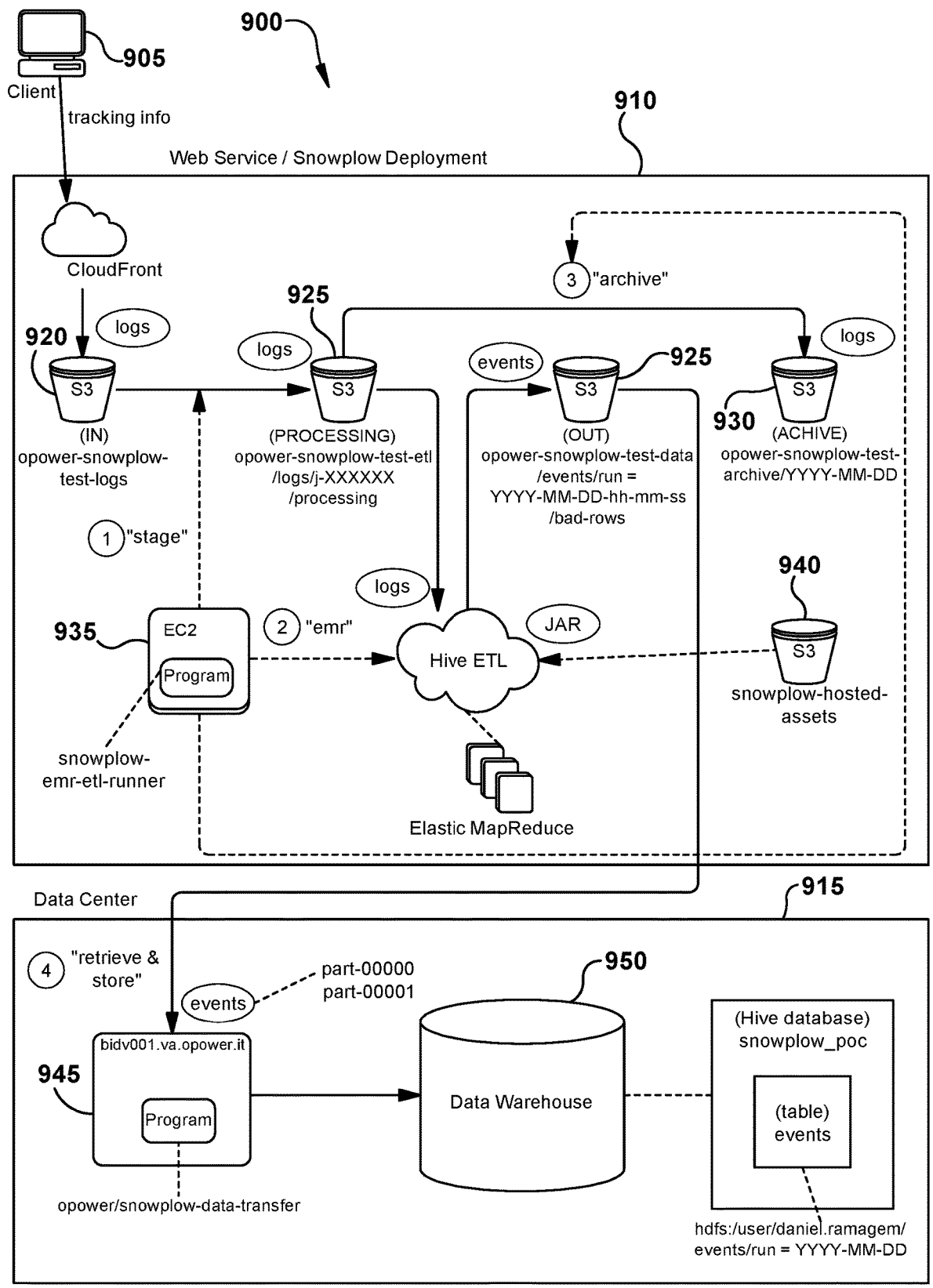
FIG. 9 illustrates an embodiment of a system associated with determining corrective actions for challenges associated with a set of remote devices.

FIG. 9 illustrates one embodiment of a system 900 associated with determining corrective actions for challenges associated with a set of remote devices is illustrated, within which system 100 operates. Client 905 is a remote device that is tracked in accordance with the tracking request 110. Application activity data of the client 905 is transmitted to a web service 910 via a network connection. The web service 910 can be configured to run a cloud-native analytics service, which may collect and process data associated with web, mobile and event activities.

The web service 910 processes the activity data through various data structures such as an inbox 920, a processing data structure 925, an outbox 925, or an archive 930. A program 935 of the web service 910 may use activity data in the inbox 920 or the processing data structure 925 to generate a data set with a programming model, such as MapReduce. An Extract, Transform and Load (ETL) process pulls the data set and stores at least some of the data into the outbox 925. In some embodiments, the ETL process also pulls data from an asset data structure 940, and stores at last some of that data into the outbox 925. The program 935 diverts some of the activity data from the processing data structure 925 to the archive 930 based upon defined rules. Each portion of the activity data is sorted based upon the applications that the portion corresponds to, and stored in the outbox 925 after being sorted.

A data center 915 retrieves the sorted activity data from the outbox 925 of the web service 910 via a network connection. A program 945 of the data center 915 stores the sorted activity data in a data warehouse 950 of the data center 915. In some embodiments, the program 945 modifies or formats the sorted activity data before storing the sorted activity data in the data warehouse 950.

In some embodiments, the entity computer 115 and the controller 105 are both components of the data center 915. In other embodiments, the entity computer 115 is a component of the data center 915 while the controller 105 is a component of the web service 910. In some embodiments, the data warehouse 950 of the data center 915 includes the application activity data structure 130.

Figure 2:
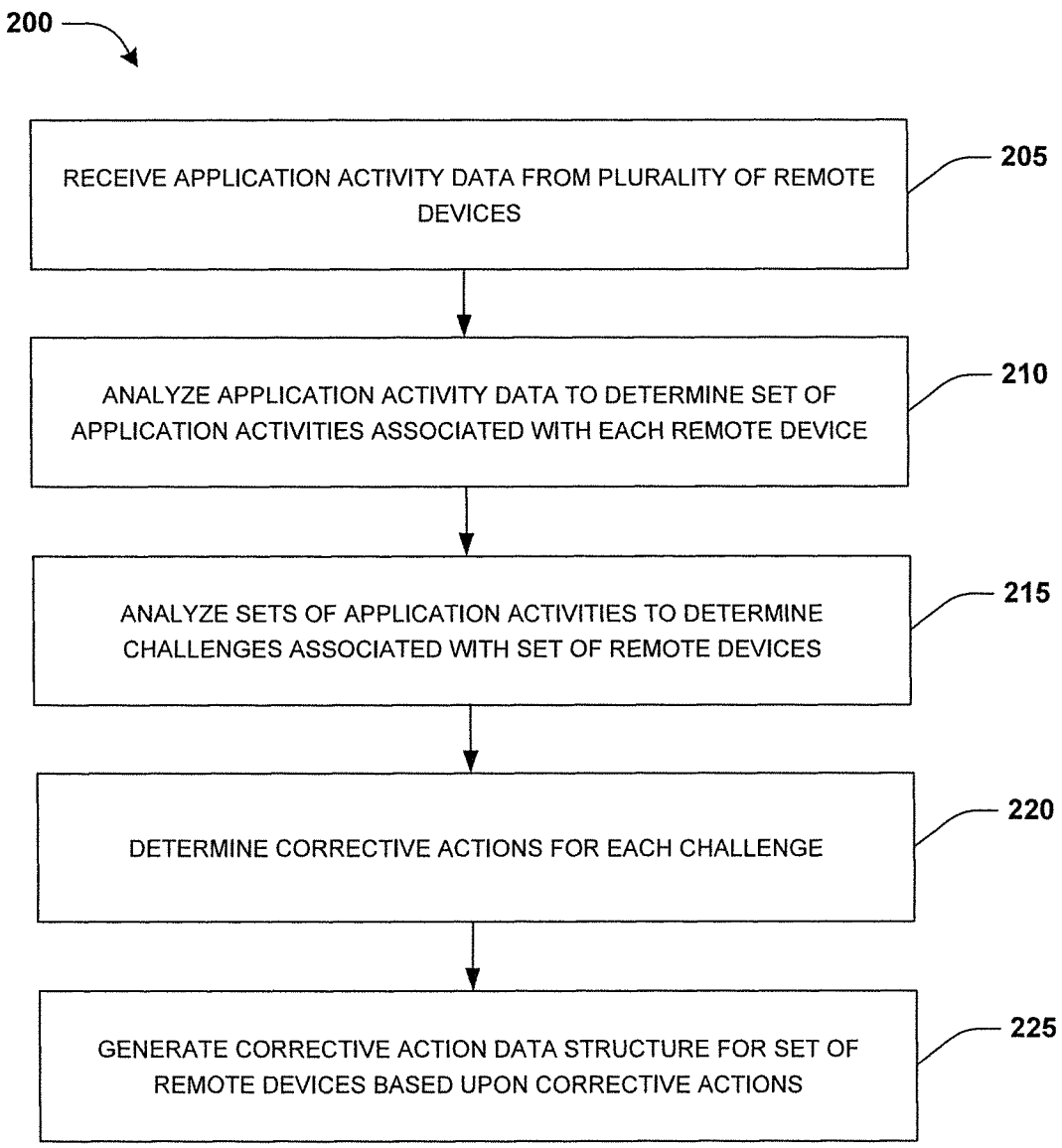
FIG. 2 illustrates an embodiment of a method associated with determining corrective actions for challenges associated with a set of remote devices.

FIG. 2 illustrates one embodiment of a computer-implemented method 200 associated with determining corrective actions for challenges associated with a set of remote devices. In one embodiment, method 200 is performed by the controller 105 utilizing various computing resources of the computer 805 (shown in FIG. 8), such as the processor 810 for executing instructions, memory 815 and/or disks 830 for storing data structures within which control instructions are generated, and/or network hardware for transmitting data structures to remote computers over networks. The method 200 may be triggered based upon various triggers, such as receipt of the tracking request 110 from the entity computer 115, etc. In some examples, the tracking request 110 is received by a server (hosting the controller 105), from the entity computer 115.

Figure 4:
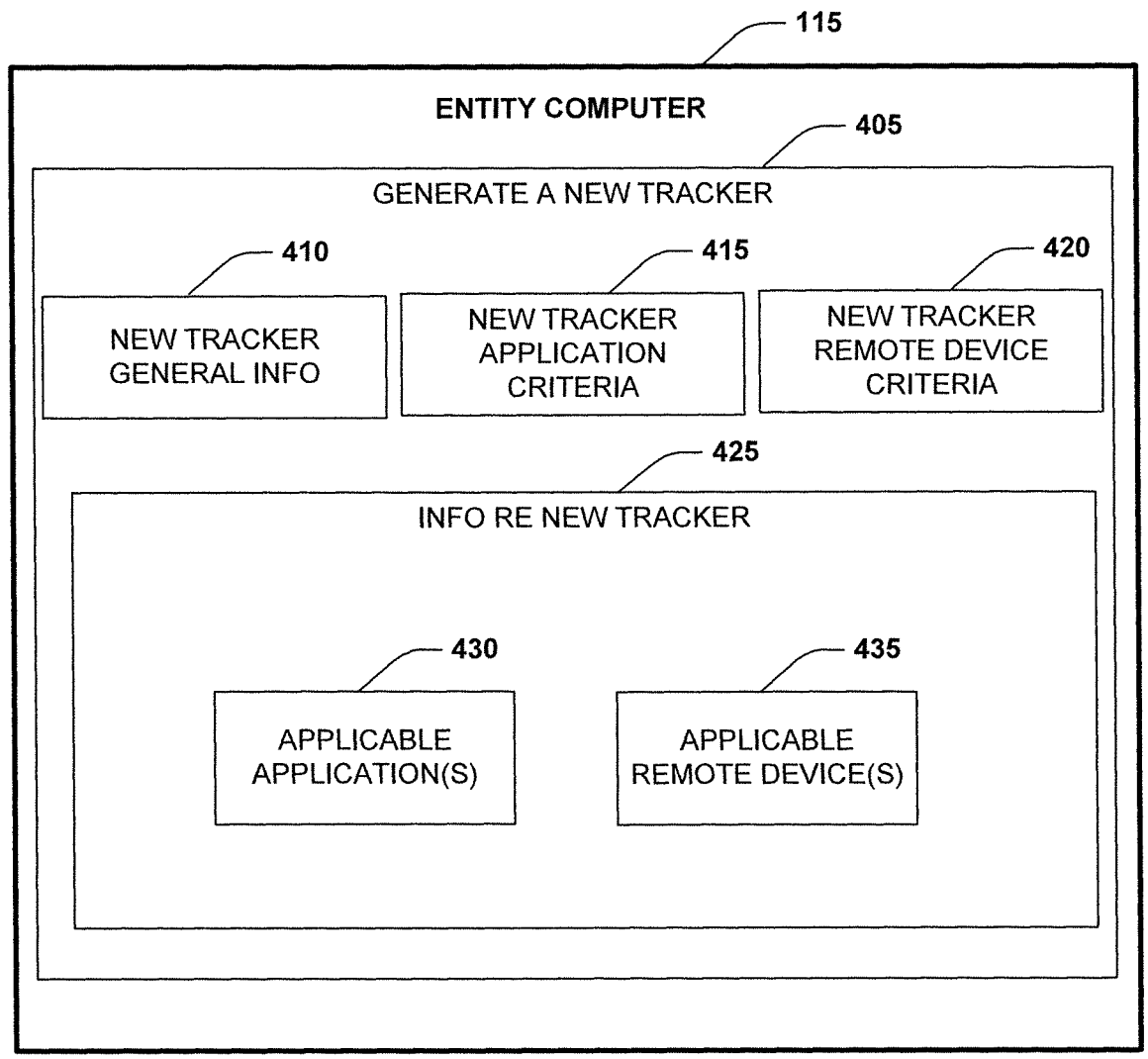
FIG. 4 illustrates an embodiment of an entity computer and a graphical user interface.

FIG. 4 illustrates one embodiment of a graphical user interface 405 on the entity computer 115 that may be used to generate the tracking request 110. The graphical user interface 405 is controlled to display a first graphical object 410 configured to receive user input that selects general information, such as a name or temporal scope, of the tracking request 110, a second graphical object 415 configured to receive user input that selects application criteria (call center management application) that the tracking request 110 pertains to, and a third graphical object 420 configured to receive user input that selects remote device criteria (all remote devices in the United States) of the tracking request 110. It may be appreciated that the remote device criteria may correspond to a geographic location, a physical distance, a common network, or a common company.

The graphical user interface 405 is further controlled, based upon the user input received for the first graphical object 410, the second graphical object 415, and the third graphical object 420, to display a fourth graphical object 425 configured to display a fifth graphical object 430 and a sixth graphical object 435. The fifth graphical object 430 is configured to display one or more applications (or combinations of applications) that are applicable to the tracking request 110. In some examples, the fifth graphical object 430 is configured to receive user input that selects at least one application (or combination of applications) from amongst a plurality of applications (or combinations of applications).

The sixth graphical object 435 is configured to display one or more remote devices (or categories thereof) that are applicable to the tracking request 110. In some examples, the sixth graphical object 435 is configured to receive user input that selects at least one remote device (or a category thereof) from amongst a plurality of remote devices (or categories thereof).

Returning to FIG. 2, at 205, application activity data 135 is received from a plurality of remote devices. In some examples, the application activity data 135 is received by the server. Instructions, such as JavaScript instructions, may be injected into applications (such as client browsers) on the remote devices, and may be used to collect the application activity data 135 from each of the remote devices. In some examples, a data processing pipeline, such as an extract, transform, load (ETL) pipeline, may be used to curate the activity data. In some examples, the application activity data 135 is aggregated into the application activity data structure 130, and then transmitted from the application activity data structure 130 to the controller 105. The application activity data 135 received from various remote devices and applications may share a common format, or may have different formats and be converted into the common format before being stored in the application activity data structure 130.

One embodiment of the application activity data structure 130 is illustrated in FIG. 3 and includes data records of a plurality of applications 305, a plurality of activities 310, devices 315 that the respective activities were performed upon, and timestamps 320 that indicate the time of performance of one or more of the plurality of activities 310.

In some examples, activities that may be tracked and stored in the application activity data structure 130 include a number of users associated with each utility, a level of proficiency of the user (e.g., in using an application), a frequency of logging into a service, a length of time spent on a website or application in each session on a remote device, the role of one or more modules used on a remote device, a frequency of accessing selected features (such as a dashboard, an export feature, or an explore feature) on a remote device, which tabs is accessed for the greatest amount of time on a remote device, an amount of time spent on selected features (filters, datasets, calculations, or scenarios) on a remote device, a frequency of checking related point information (sibling information or parent information) on a remote device, which filter is used most commonly on a remote device, what is the percentage of usage of each filter type (simple, advanced, or algorithm), which panel is used on a remote device, which drop downs are used on a remote device, how frequently a list view is accessed on a remote device, how often a panel is exported from a remote device, whether an exported panel is in list view or graph view, what information a remote device displays on a map in addition to default settings (individual points, pop-ups, or neighboring point identifiers), the type of information that is most commonly exported, how frequently data is viewed on a remote device but not exported, a format that is used to export data, which drill-down panel is used most commonly on a remote device, for which panel in summary view are changes made on a remote device to view different information, which information is selected on a remote device, or how often a link is used on a remote device.

Returning to FIG. 2, at 210, the application activity data 135 is analyzed to determine a set of application activities associated with each of the plurality of remote devices. Each set of application activities may be determined by aggregating application activities associated with a common web browser, IP address, cloud provider, or customer account. The application activity data 135 may be scanned to identify patterns associated with bots or scrapers, and activity data associated with the identified patterns may be removed to eliminate noise in the data and improve the accuracy of analysis. In some examples, the application activities of multiple remote devices can be aggregated into a single set of application activities, based upon a determination that the multiple remote devices share a common characteristic, such as running a same application, or a same combination of applications. In some examples, the sets of application activities represent the experiences/stories of one or more users with one or more applications on remote devices, and are retrieved via a network communication.

At 215, the sets of application activities are analyzed to determine one or more challenges associated with a set of remote devices of the plurality of remote devices. In some examples, a first challenge (or set of challenges) may be determined based upon a first combination of one or more activities performed on a first user device via a first application. For example, based upon the data records in FIG. 3 indicating that device (3) viewed an account tree in a call center manager application and opened a branch in the account tree in the call center manager application, a determination may be made that the user of device (3) is likely facing a first challenge and/or attempting to perform a first objective/result.

In some examples, a second challenge (or set of challenges) may be determined based upon a second combination of one or more activities performed on the first user device on the first application and a second application. For example, based upon the data records in FIG. 3 indicating that device (3) viewed an account tree in a call center manager application, opened a branch in the account tree in the call center manager application, and browsed a customer profile in a customer billing application, a determination may be made that the user of device (3) is likely facing the second challenge and/or attempting to perform a second objective/result.

In some examples, the sets of application activities are analyzed to determine a probability of one or more challenges being associated with the set of remote devices. One or more challenges that are associated with a probability that exceeds a threshold may be selected, or the challenges may be ranked based upon their respective probabilities, and one or more of the highest ranking challenges may be selected.

In some examples, a challenge is determined to be associated with a remote device (or a set of remote devices) in response to determining that the application activities indicative of the challenge were identified in a threshold number of remote devices. For example, the first challenge may be determined to be associated with the first remote device (or a first set of remote devices) in response to determining that at least five remote devices performed the activities (or similar activities) that correspond to the first challenge.

The threshold number of remote devices may apply to every challenge, or may vary (and be dynamically determined) based upon a type of a challenge. For example, challenges that correspond to suspected graphical user interface shortcomings may have lower thresholds than challenges that correspond to suspected lack of features.

In some examples, the threshold number of remote devices for each challenge may vary (and be dynamically determined) based upon the type of corrective actions associated with the challenge. For example, challenges that are associated with corrective actions that merely require the installation of a patch may have lower thresholds than challenges that require a complete upgrade or reinstall. In another example, the threshold number of remote devices may be dynamically determined for a challenge based upon an amount of code that, as a result of a corrective action of the challenge, is expected to be modified, added or removed.

Returning to FIG. 2, at 220, corrective actions are determined for each of the one or more challenges. The corrective actions may include a modification of code, such as a patch or an upgrade. In some examples, the corrective actions may include generating a report illustrating the challenges and the corresponding activities. The report may be specific to a set of remote devices that fit within defined/requested demographics, or may be specific to a plurality of users that performed common/similar actions or share common activity-based characteristics. In some examples, the corrective actions may include generating corrective guidance/feedback that explains the challenge and steps that can be taken on the remote devices (such as by users) to avert the challenge.

At 225, a corrective action data structure is generated for the set of remote devices based upon the corrective actions. In some examples, the corrective actions are analyzed to determine a probability of each of the corrective actions addressing the corresponding challenges. One or more corrective actions that are associated with a probability that exceeds a threshold may be selected for inclusion in the corrective action data structure, or the corrective actions may be ranked based upon their respective probabilities, and one or more of the highest ranking corrective actions may be selected. For example, where three corrective actions are determined for the first challenge, the corrective action of the three that is determined to be most likely to address the first challenge and/or achieve a desired objective/result may be selected while the other corrective actions may be discarded.

The corrective action data structure can thus include code that is transmitted to one or more remote devices, and when executed, cause the remote devices to modify existing application code in a manner that overcomes the challenges. In some examples, the code can be transmitted to a server or manager of applications of the remote devices, which may re-transmit the code (or customize the code for each remote device, then transmit the customized code) to each remote device, or may modify framework code in the server.

In some examples, the corrective action data structure can include a report that is transmitted to the server or the manager of the applications, or can include corrective guidance that can explain (in step by step instructions) actions to be performed on each of the remote devices to overcome the corresponding challenges. The report can illustrate a journey of activity across one or more products by a remote device at an individual level, or multiple journeys at an aggregate level.

Figure 5:
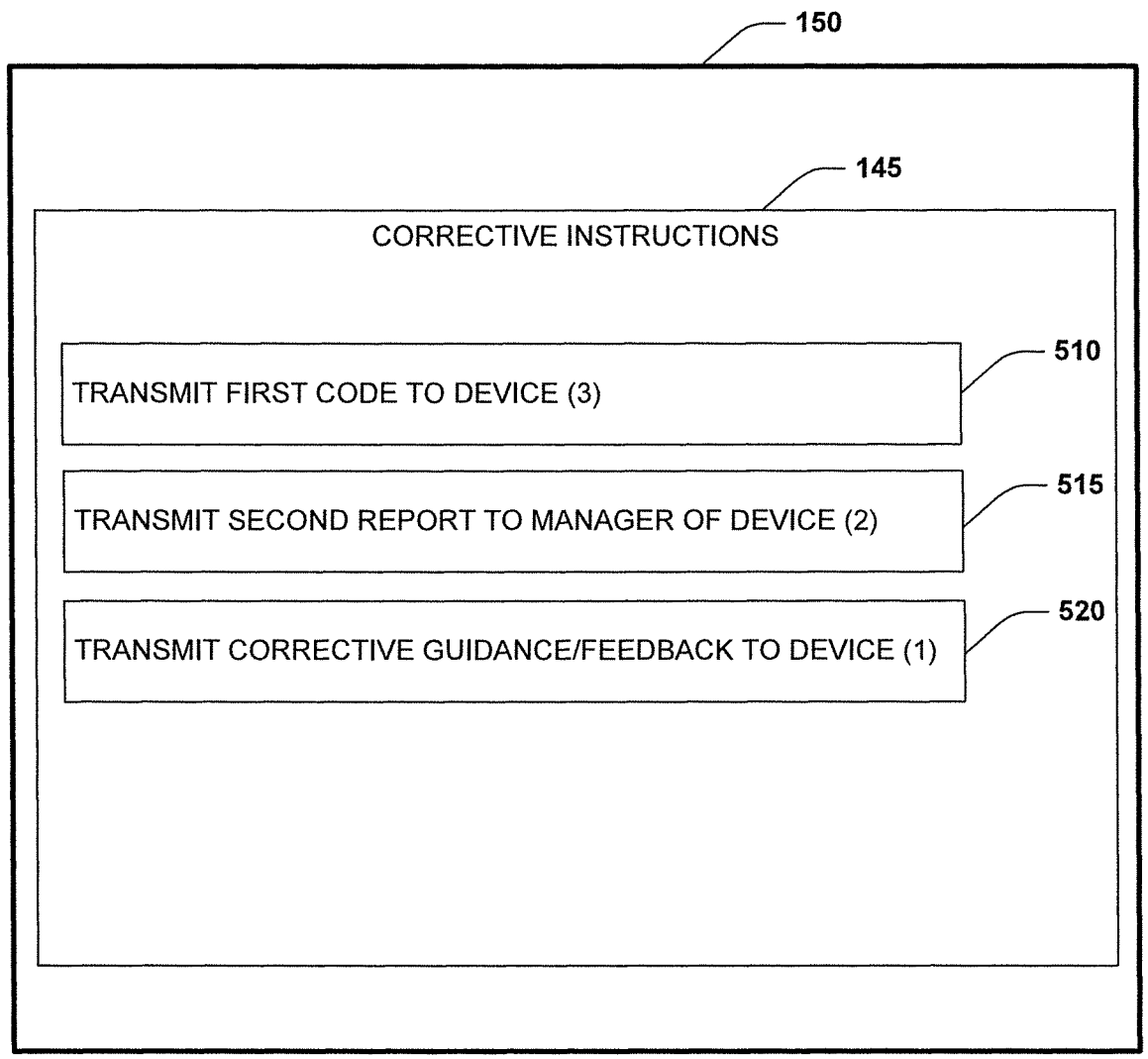
FIG. 5 illustrates an embodiment of a corrective actions implementer with control instructions.

The corrective action data structure can be used to generate the corrective instructions 145. One embodiment of the corrective instructions 145 is illustrated in FIG. 5 and includes a first instruction 510 to transmit first code to device (3), a second instruction 515 to transmit a second report to a managing device associated with device (2), and a third instruction 520 to transmit corrective guidance/feedback to device (1). The corrective guidance/feedback may be generated for display on a display screen 600 the device (1).

Figure 6:
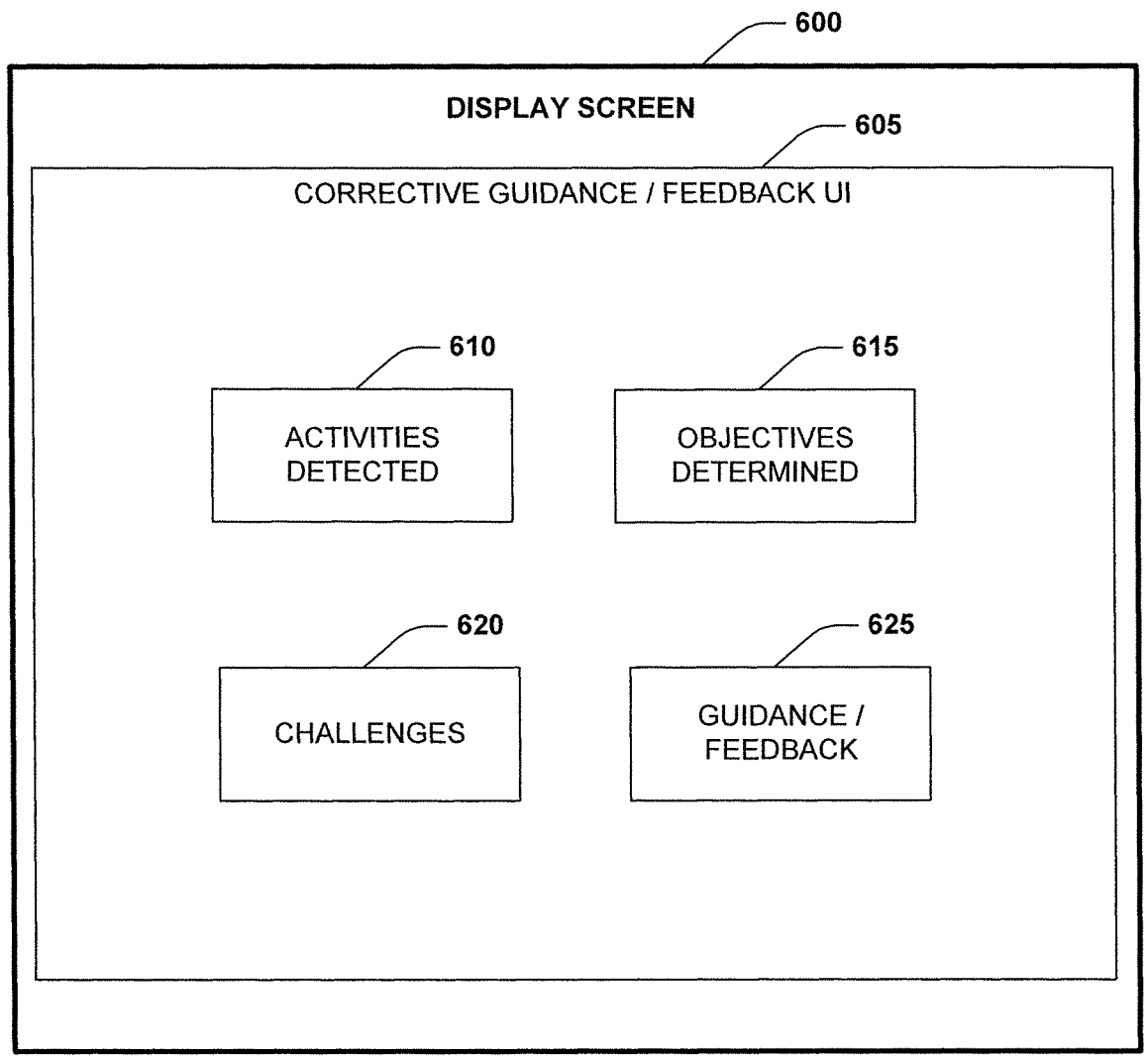
FIG. 6 illustrates an embodiment of a display screen and a graphical user interface.

One embodiment of the controlling of the display screen 600 is illustrated in FIG. 6. The display screen 600 renders a guidance graphical user interface 605, which includes a graphical object 610 graphically representing the activities on the device (1) that were detected and used to generate the corrective guidance/feedback. The guidance graphical user interface 605 further includes a graphical object 615 graphically representing the objectives/results that is determined to be sought/attempted based upon the activities of the device (1). The guidance graphical user interface 605 further includes a graphical object 620 graphically representing the challenges that seem to be inhibiting the device (1) from reaching the objectives/results. The guidance graphical user interface 605 further includes a graphical object 625 graphically representing guidance/feedback, such as actions that can be taken on the device (1) in order to overcome the challenges and reach the objectives/results. The controlling of the display screen 600 increases the speed at which graphical objects associated with the objectives 615 are identified, and thus improves the speed and usability of computer displays.

In some examples, application activities may not be analyzed to determine challenges. Application activities may be analyzed to determine common activities across various remote devices, and a report may be generated identifying the number or proportion of remote devices that performed each activity, and demographic or technical identifiers of the remote devices.

In some examples, generation of a corrective action data structure may help an entity, such as a utility entity, understand how applications are being used by remote devices. Such generation may further support data driven product development. For example, based upon the corrective action data structure, the entity may prioritize bug fixes and features based on actual usage patterns, may determine which applications (and which versions of applications) warrant continued support, and determine whether new features are actually used by clients. Analytics may be provided to the entity illustrating how sets of applications are impacting their engagement with their customer base, providing metrics and actionable insights on improving their customer satisfaction and engagement numbers based upon the sets of applications.

Figure 7:
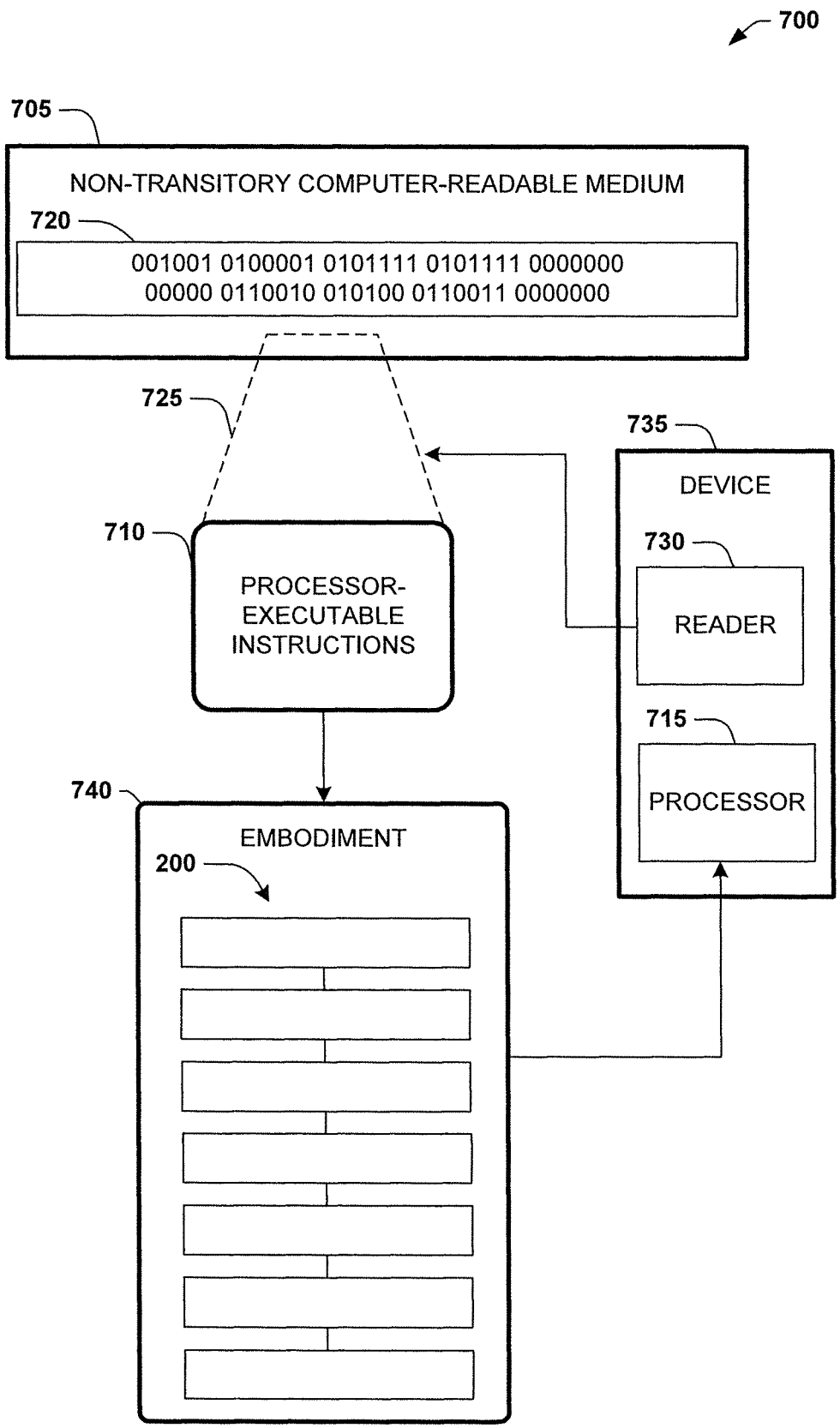
FIG. 7 illustrates an embodiment of a non-transitory computer-readable medium.

FIG. 7 is an illustration of a scenario 700 involving an example non-transitory computer-readable medium 705. In one embodiment, one or more of the components described herein are configured as program modules, such as the controller 105, stored in the non-transitory computer-readable medium 705. The program modules are configured with stored instructions, such as processor-executable instructions 710, that when executed by at least a processor, such as processor 715, cause the computing device to perform the corresponding function(s) as described herein. For example, functionality of the controller 105, stored in the non-transitory computer-readable medium 705, may be executed by the processor 715 as the processor-executable instructions 710 to perform an embodiment 740 of the method 200 of FIG. 2.

The non-transitory machine readable medium 705 includes the processor-executable instructions 710 that when executed by a processor 715 cause performance of at least some of the provisions herein. The non-transitory machine readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the example method 200 of FIG. 2, for example. In some embodiments, the processor-executable instructions 710 are configured to cause implementation of a system, such as at least some of the example system 100 of FIG. 1, for example.

Figure 8:
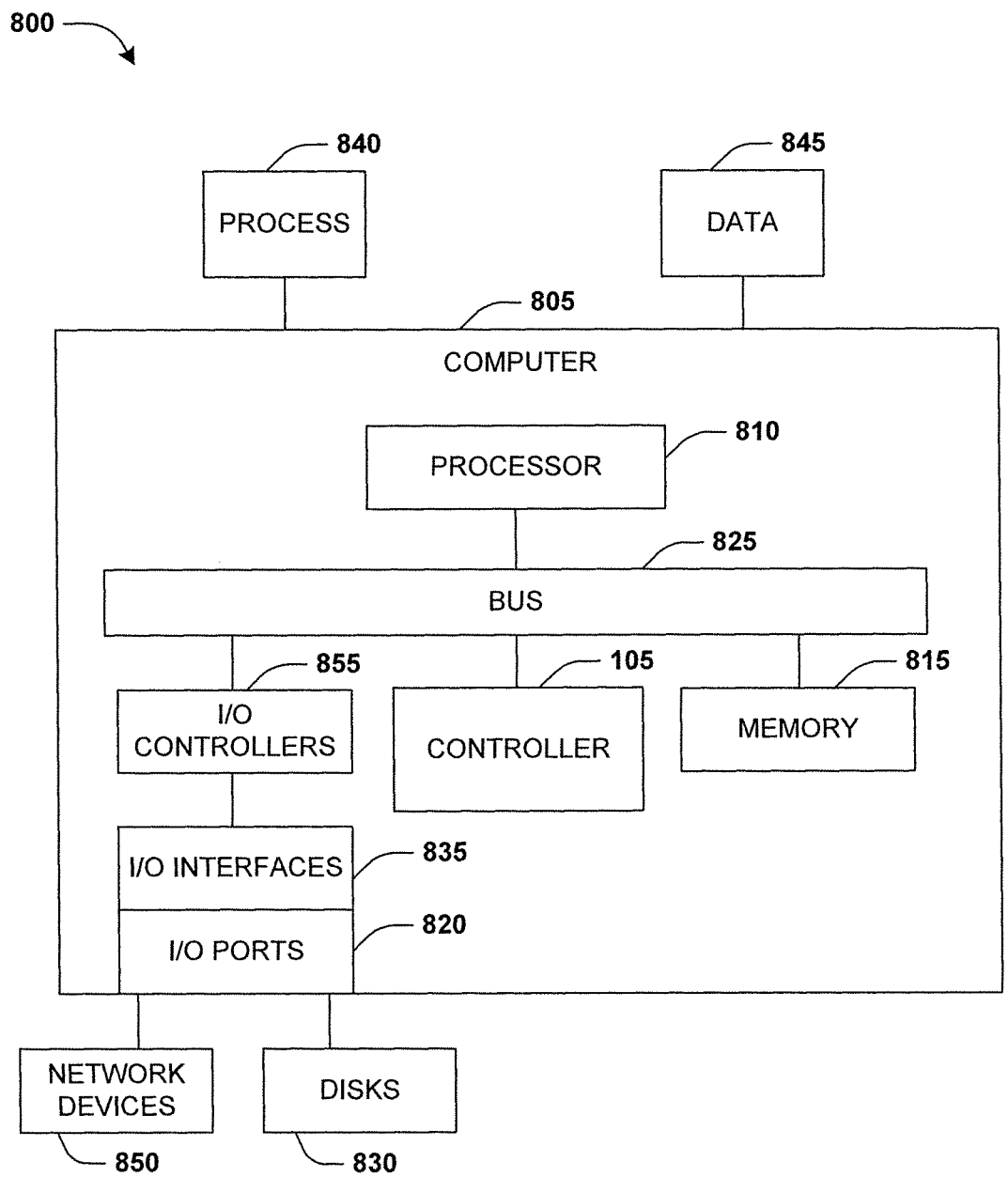
FIG. 8 illustrates an embodiment of a computing system configured with the example systems and/or methods disclosed.

FIG. 8 illustrates a scenario 800 of an example computing device that is configured and/or programmed with one or more of the example systems and methods described herein, and/or equivalents. The example computing device may be a computer 805 that includes a processor 810, a memory 815, and input/output ports 820 operably connected by a bus 825. In one example, the computer 805 may include logic of the controller 105 configured to facilitate the system 100 and/or the method 200 shown in FIGS. 1 and 2. In different examples, the logic of the controller 105 may be implemented in hardware, a non-transitory computer-readable medium 705 with stored instructions, firmware, and/or combinations thereof. While the logic of the controller 105 is illustrated as a hardware component attached to the bus 825, it is to be appreciated that in other embodiments, the logic of the controller 105 could be implemented in the processor 810, stored in memory 815, or stored in disk 830.

In one embodiment, logic of the controller 105 or the computer 805 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 805 as data 845 that are temporarily stored in memory 815 and then executed by processor 810.

The logic of the controller 105 may also provide means (e.g., hardware, non-transitory computer-readable medium 705 that stores executable instructions, firmware) for performing rule based source sequencing for allocation.

Generally describing an example configuration of the computer 805, the processor 810 may be a variety of various processors including dual microprocessor and other multi-processor architectures. The memory 815 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 830 may be operably connected to the computer 805 via, for example, an input/output (I/O) interface (e.g., card, device) 835 and an input/output port 820. The disks 830 may be, for example, a magnetic disk drive, a solid state disk drive, a floppy disk drive, a tape drive, a Zip drive, a flash memory card, a memory stick, and so on. Furthermore, the disks 830 may be a CD-ROM drive, a CD-R drive, a CD-RW drive, a DVD ROM, and so on. The memory 815 can store a process 840 and/or a data 845, for example. The disk 830 and/or the memory 815 can store an operating system that controls and allocates resources of the computer 805.

The computer 805 may interact with input/output (I/O) devices via the I/O interfaces 835 and the input/output ports 820. Input/output devices may be, for example, a keyboard, a microphone, a pointing and selection device, cameras, video cards, displays, the disks 830, the network devices 850, and so on. The input/output ports 820 may include, for example, serial ports, parallel ports, and USB ports. I/O controllers 855 may connect the I/O interfaces 835 to the bus 825.

The computer 805 can operate in a network environment and thus may be connected to the network devices 850 via the I/O interfaces 835, and/or the I/O ports 820. Through the network devices 850, the computer 805 may interact with a network. Through the network, the computer 805 may be logically connected to remote computers. Networks with which the computer 805 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   receive, by at least the processor, application activity data from a plurality of remote devices that execute a set of different applications associated with an organization, wherein the application activity data is indicative of user interactions with one or more applications from the set of different applications;
   wherein the application activity data includes data records indicative of the user interactions including clicks and keystrokes that perform actions with the one or more applications from the set of different applications;
   analyze, by at least the processor, the application activity data to determine one or more challenges experienced by the user interactions while attempting to achieve a result using the one or more applications, wherein the one or more challenges indicate a bug exists in code in the one or more applications that causes the one or more applications to operate incorrectly;
   wherein the one or more challenges that indicate the bug exists in the code in the one or more applications are determined based on at least the clicks and the keystrokes performed by the user interactions while attempting to achieve the result including a selection of an element in a user interface of the one or more applications;
   determine, by at least the processor, a corrective action for the one or more challenges that are determined from at least in part the clicks and the keystrokes performed while attempting to achieve the result,
   wherein the corrective action is determined by matching the identified one or more challenges with a corresponding corrective action in a database;

wherein the corrective action includes patch code configured as a patch that modifies the code of a selected application by changing one or more functions in the selected application to fix the bug in the selected application; and transmit, by at least the processor, a corrective action data structure over a communication network to the plurality of remote devices, to control operation of the plurality of remote devices by implementing the corrective action within the selected application on the plurality of remote devices to mitigate the one or more challenges.

2. The non-transitory computer-readable medium of claim 1, wherein the corrective action data structure comprises the patch code of the patch that when received and executed by the plurality of remote devices causes a modification to the selected application executed by the plurality of remote devices that mitigates the one or more challenges.

3. The non-transitory computer-readable medium of claim 1, wherein the corrective action data structure further comprises a report identifying (i) the one or more challenges associated with the plurality of remote devices, and (ii) the corrective actions determined for the one or more challenges.

4. The non-transitory computer-readable medium of claim 1, wherein the computer-executable instructions to analyze the application activity data to determine one or more challenges further include computer-executable instructions that when executed by the processor cause the computer to:
determine that a first set of application activities of a first remote device of the plurality of remote devices is associated with a first challenge;
determine that a second set of application activities of a second remote device of the plurality of remote devices is associated with the first challenge; and
responsive to determining that the first remote device and the second remote device are both associated with the first challenge, transmit the corrective action data structure to the first remote device and the second remote device.

5. The non-transitory computer-readable medium of claim 1, further comprising instructions that when executed by at least the processor cause the computer to transmit the corrective action data structure to each of the remote devices.

6. The non-transitory computer-readable medium of claim 1, further comprising instructions that when executed by at least the processor cause the computer to:
generate a graphical user interface based upon the corrective action data structure; and
provide the graphical user interface for display.

7. The non-transitory computer-readable medium of claim 1, wherein the data records indicative of the user interactions further include data of interactions indicative of a modification of a graphical rendering.

8. A computing system, comprising:
a processor connected to memory; and
a corrective module stored on a non-transitory computer readable medium and configured with instructions that when executed by the processor cause the processor to:
receive application activity data from a plurality of remote devices that execute a set of different applications associated with an organization, wherein the application activity data is indicative of user interactions with one or more applications from the set of different applications;
wherein the application activity data includes data records indicative of the user interactions including clicks and keystrokes that perform actions with the one or more applications from the set of different applications;
analyze the application activity data to determine one or more challenges experienced by the user interactions while attempting to achieve a result using the one or more applications, wherein the one or more challenges indicate a bug exists in code in the one or more applications that causes the one or more applications to operate incorrectly;
wherein the one or more challenges that indicate the bug exists in the code in the one or more applications are determined based on at least the clicks and the keystrokes performed by the user interactions while attempting to achieve the result including a selection of an element in a user interface of the one or more applications;
determine a corrective action for the one or more challenges, wherein the corrective action includes patch code configured as a patch that modifies the code of a selected application by changing one or more functions in the selected application to fix the bug in the selected application;
wherein the corrective action is determined by matching the identified one or more challenges with a corresponding corrective action in a database; and
transmit a corrective action data structure over a communication network to the plurality of remote devices, to control operation of the plurality of remote devices to implement the corrective action on the plurality of remote devices and mitigate the one or more challenges.

9. The computing system of claim 8, wherein the corrective action data structure comprises the patch code of the patch that when received and executed by a remote device causes a modification to the selected application executed by the plurality of remote devices that mitigates the one or more challenges.

10. The computing system of claim 8, wherein the corrective action data structure further comprises a report identifying (i) the one or more challenges associated with the plurality of remote devices, and (ii) the corrective actions determined for the one or more challenges.

11. The computing system of claim 8, wherein the instructions to analyze the application activity data to determine one or more challenges further include instructions that when executed by the processor cause the processor to:
determine that a first set of application activities of a first remote device of the plurality of remote devices is associated with a first challenge;
determine that a second set of application activities of a second remote device of the plurality of remote devices is associated with the first challenge; and
responsive to determining that the first remote device and the second remote device are both associated with the first challenge, transmit the corrective action data structure to the first remote device and the second remote device.

12. The computing system of claim 8, wherein the corrective module is further configured with instructions that when executed by the processor cause the processor to transmit the corrective action data structure to each of the remote devices.

13. The computing system of claim 8, wherein the corrective module is further configured with instructions that when executed by the processor cause the processor to:
generate a graphical user interface based upon the corrective action data structure; and
provide the graphical user interface for display.

14. The computing system of claim 8, wherein the corrective module is further configured with instructions that when executed by the processor cause the processor to transmit the corrective action data structure to a managing entity of the plurality of remote devices.

15. A computer-implemented method performed by a computing device comprising a processor, the computer-implemented method comprising:
receiving, by at least the processor, application activity data from a plurality of remote devices that execute a set of different applications associated with an organization, wherein the application activity data is indicative of user interactions with one or more applications from the set of different applications;
wherein the application activity data includes data records indicative of the user interactions including clicks and keystrokes that perform actions with the one or more applications from the set of different applications;
analyzing, by at least the processor, the application activity data to determine one or more challenges experienced by the user interactions while attempting to achieve a result using the one or more applications, wherein the one or more challenges indicate a bug exists in code in the one or more applications that causes the one or more applications to operate incorrectly;
wherein the one or more challenges that indicate the bug exists in the code in the one or more applications are determined based on at least the clicks and the keystrokes performed by the user interactions while attempting to achieve the result including a selection of an element in a user interface of the one or more applications;
determining, by at least the processor, a corrective action for each of the one or more challenges, wherein the corrective action includes patch code configured as a patch that modifies the code of a selected application by changing one or more functions in the selected application to fix the bug in the selected application;
wherein the corrective action is determined by matching the identified one or more challenges with a corresponding corrective action in a database; and
transmit, by at least the processor, a corrective action data structure over a communication network to the plurality of remote devices, to control operation of the plurality of remote devices by implementing the corrective action within the selected application on the plurality of remote devices to mitigate the one or more challenges.

16. The computer-implemented method of claim 15, wherein the corrective action data structure comprises the patch with the patch code that when received and executed by the plurality of remote devices causes a modification to the selected application in the set of different applications that mitigates the one or more challenges.

17. The computer-implemented method of claim 15, wherein the corrective action data structure further comprises a report identifying (i) the one or more challenges associated with the plurality of remote devices, and (ii) the corrective actions determined for the one or more challenges.

18. The computer-implemented method of claim 15, wherein the analyzing the application activity data to determine one or more challenges comprises:
determining that a first set of application activities of a first remote device of the plurality of remote devices is associated with a first challenge;
determining that a second set of application activities of a second remote device of the plurality of remote devices is associated with the first challenge; and
responsive to determining that the first remote device and the second remote device are both associated with the first challenge, transmitting the corrective action data structure to the first remote device and the second remote device.

19. The computer-implemented method of claim 15, further comprising transmitting the corrective action data structure to each of the plurality of remote devices.

20. The computer-implemented method of claim 15, further comprising transmitting the corrective action data structure for the plurality of remote devices to a managing entity of the plurality of remote devices.

* * * * *